(12) United States Patent
Kang

(10) Patent No.: US 6,253,329 B1
(45) Date of Patent: Jun. 26, 2001

(54) UNIVERSAL SERIAL BUS (USB) HUB HAVING A PLURALITY OF INPUT POWER SOURCES

(75) Inventor: Hyun-Seek Kang, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/232,809

(22) Filed: Jan. 19, 1999

(30) Foreign Application Priority Data

Jan. 16, 1998 (KR) .................................................. 98-1261

(51) Int. Cl.$^7$ ........................................................ G06F 1/28
(52) U.S. Cl. .............................. 713/300; 713/310; 714/14
(58) Field of Search .................................. 713/300, 340, 713/320, 310; 714/22, 40, 14; 710/63, 100, 126

(56) References Cited

U.S. PATENT DOCUMENTS 5,799,196 * 8/1998 Flannery .
6,000,042 * 12/1999 Henrie .

* cited by examiner

*Primary Examiner*—Gopal C. Ray
(74) *Attorney, Agent, or Firm*—Robert E. Bushnell, Esq.

(57) ABSTRACT

A universal serial bus (USB) hub having a plurality of input power sources receives power through an upstream cable or from a local power source unit, and uses it for internal power consumption in the USB hub and for distribution to other USB functions through at least one downstream port. The hub includes a power source interface for inputting both bus power provided through the upstream cable and self-power generated by the local power source unit. Whether or not self-power is to be supplied is determined based on whether or not a user connects an additional power source cable to the USB hub. Thus, it is not necessary for the user to purchase a bus power USB hub or a self-power USB hub separately. The user can easily select a power source supply method which would fit his needs by simply adding a power source cable for self-power.

26 Claims, 4 Drawing Sheets

UNIVERSAL SERIAL BUS (USB) HUB HAVING A PLURALITY OF INPUT POWER SOURCES

CLAIM OF PRIORITY

This application makes reference to, incorporates the same herein, and claims all benefits accruing under 35 U.S.C. §119 from applications for A USB HUB HAVING A PLURALITY OF INPUT POWER SOURCES earlier filed in the Korean Industrial Property Office on Jan. 16, 1998, and there duly assigned Ser. No. 98/1261.

BACKGROUND OF THE INVENTION

1. Technical Field

The present invention relates, in general, to a universal serial bus (USB) hub, and more particularly to a USB hub having a plurality of input power sources which are capable of using bus power or self-power as power for the USB hub in accordance with a user's selection.

2. Related Art

The term "USB" relates to a standard for a universal-type serial bus. In order to facilitate connections between an existing personal computer and peripheral equipment, and in order to cope with a future multi-media environment, such companies as Intel, Microsoft, Compaq and NEC developed a common spec in which transmission speed reaches, at a maximum, 12 Mbps.

The term "USB hub" signifies hardware that serves as a medium for connecting peripheral equipment (a maximum of 127 in number) to a single personal computer in accordance with a USB standard. It provides both data and power distribution.

The cable connection topology of the USB has a construction which amounts to branching through the USB hub. At the lower part of the USB hub, it is possible to connect a function or another USB hub, resulting in a multi-star type topology.

As to the topology described above, a main body of the personal computer having a root hub is placed at the uppermost part thereof, and a hub controller provided in the main body of the personal computer provides communication between USB hubs.

The USB hub functions to carry out its internal function or to distribute power supplied to other hubs and functions connected at the lower part. Thus, the USB hub is supplied with bus power Vbus (upstream power from an upper hub) through a USB cable, or is supplied with self-power Vself from a local power supply unit (an additional independent power supply unit) through a power cable.

Hereinafter, the above-described USB hub supplied with bus power is termed a "bus power USB hub", and the USB hub supplied with self-power is termed a "self-power USB hub".

As described in more detail below, under certain conditions, a user needs a bus power USB hub. Under other conditions, a self-power USB hub is needed or will suffice. Whether or not the user is able to obtain one type of USB hub or the other is sometimes dependent on which type is manufactured and/or provided by the manufacturer.

Thus, there is a need for a USB hub having a plurality of power sources, wherein the user can conveniently select the power source between a local power source or an upstream cable, and can use the selected power source for internal power requirements or for distribution of power to other USB functions.

SUMMARY OF THE INVENTION

An object of the present invention is to provide a USB hub having a plurality of input power supplies. A user can simply supply, for his use, self-power generated at a local power supply unit upon necessity. Bus power, inputted through an upstream cable, can also be selected by the user by simply connecting a cable thereto without an additional switch operation. Thus, the power supply method is determined by the user and not by the manufacturer.

In order to attain the above object, there is provided a USB hub having a plurality of input power sources. The USB hub receives power through an upstream cable or from a local power source unit and uses it as an internal consumption power source of the USB hub, and also can distribute it to other USB functions through each downstream port. A power source interface is provided for inputting both bus power provided through an upstream cable and self-power generated by a local power source unit. Whether or not self-power will be supplied is determined according to whether a user connects an additional power source cable to the USB hub.

Additional advantages, objects and other features of the invention will be set forth in part in the description which follows and in part will become apparent to those having ordinary skill in the art upon examination of the following or may be learned from practice of the invention. The object and advantages of the invention may be realized and attained as particularly pointed out in the appended claims.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

A preferred embodiment of the present invention will now be described with reference to the accompanying drawings.

Figure 1:
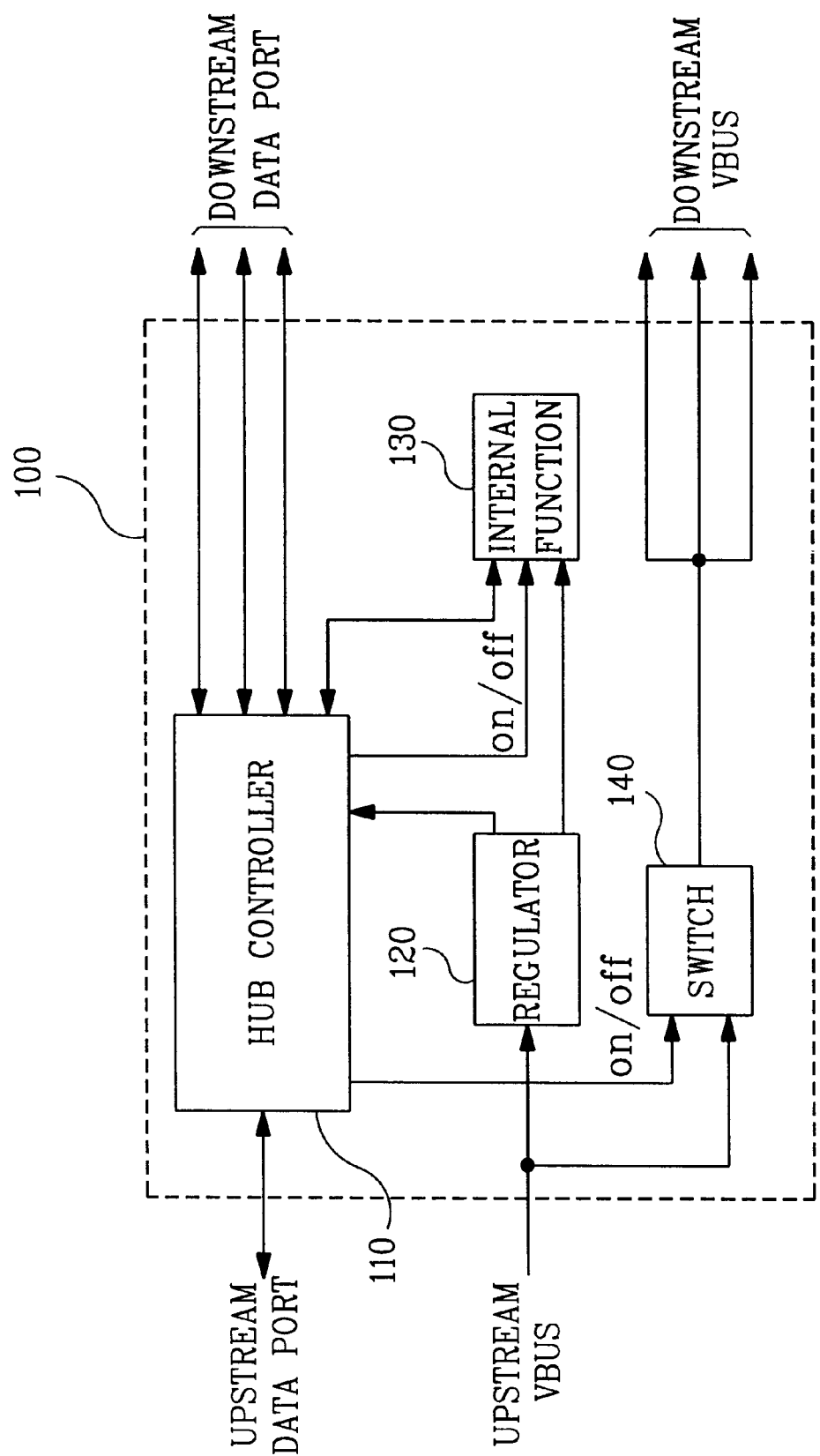
FIG. 1 is a schematic block diagram illustrating one embodiment of a bus power USB hub.

FIG. 1 is a block diagram Illustrating an embodiment of a bus power USB hub.

As shown in FIG. 1, the bus power USB hub 100 includes a hub controller 110 performing data transmission between an upstream data port and a downstream data port, performing data exchange with internal function 130, and controlling power distribution; an internal function 130 controlled as to turn-on/turn-off by the hub controller 110, and having a predetermined USB function by exchanging data with the hub controller 110; a regulator 120 for supplying power to the hub controller 110, which is actuated at a voltage lower than an input upstream bus power Vbus and the internal function 130; and a switch 140 for supplying the upstream bus power Vbus, inputted in accordance with an on/off control signal of the hub controller 110, to the downstream port.

The operation of the power distribution function of the bus power USB hub 100, as constructed above, will now be described.

The upstream bus power Vbus applied to the USB hub 100 is transmitted to the downstream port through the switch 140, which is on/off controlled by the hub controller 110. The upstream bus power Vbus normally supplies power for driving a 3.3V-rated hub controller 110 and the internal function 130 through the regulator 120, which steps down 5V bus power to 3.3V bus power.

The bus power USB hub 100 has such a standard that it receives 5V, 500 mA bus power Vbus through the upstream cable, and supports 5V, 100 MA power for each downstream port.

Figure 2:
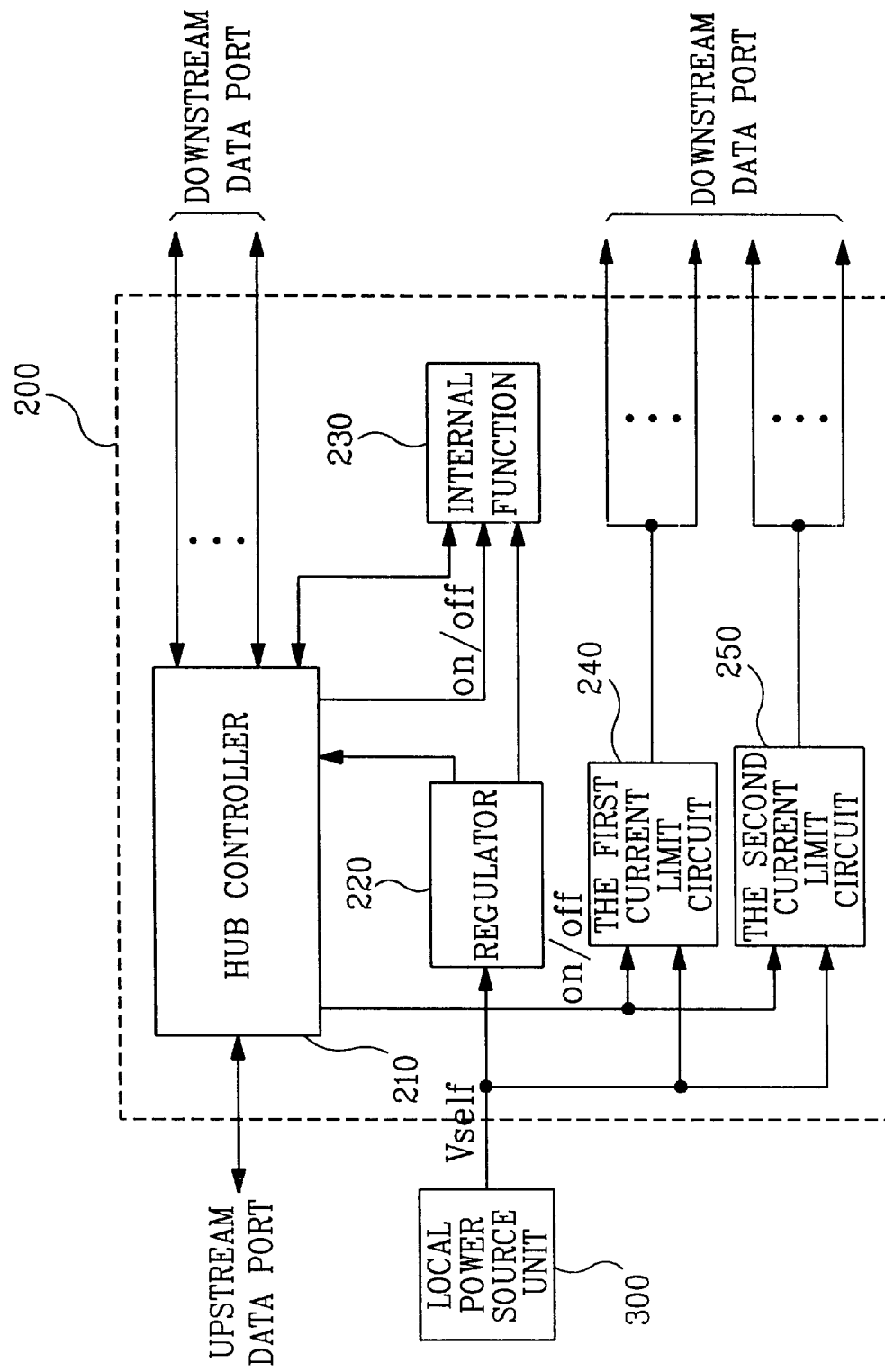
FIG. 2 is a schematic block diagram illustrating one embodiment of a self-power USB hub.

FIG. 2 is a block diagram illustrating an embodiment of the self-power USB hub. As shown in FIG. 2, the self-power USB hub 200 includes a hub controller 210 for performing data transmission between an upstream data port and a downstream data port, performing data exchange with internal function 230, and controlling power distribution; an internal function 230 controlled as to turn-on/turn-off by the hub controller 210, and having a predetermined USB function by exchanging data with the hub controller 210; a local power supply unit 300 supplying power to the self-power USB hub 200; a regulator 220 supplying power to the hub controller 210 which is actuated at a voltage lower than the self-power Vself inputted from the local power supply unit 300, and supplying power to the internal function 230; and first and second current limit circuits 240 and 250, respectively, for supplying self-power, inputted in accordance with the On/Off control signal from the hub controller 210 to the downstream port. Operation of the power distribution function of the self-power USB hub 200, as constructed above, will now be described.

The self-power Vself supplied by the local power supply unit 300 to the USB hub 200 is transmitted to the downstream port through the current limit circuits 240 and 250, which are on/off controlled by the hub controller 210.

The local power supply unit 300 is an external independent power supply unit of the USB hub 200, and the power generated by the local power supply unit 300 is applied to the USB hub 200 through an additional power cable rather than a USB cable.

The current limit circuits 240 and 250 are necessary to protect functions connected to the downstream port by supplying a constant current to the downstream port because the current supplied by the self-power Vself from local power supply 300 may flow at a few amperes (A).

The self-power Vself is normally supplied as power for driving a 3.3V-rated hub controller 210 and the internal function 230 through the regulator 220, which steps down 5V self-power Vself to 3.3V self-power.

The self-power USB hub 200 has such a standard that it receives 5V, 3.5 A self-power Vself through a normal power cable and supports 5V, 500 mA power for each downstream port.

As to the bus power USB hub 100 or self-power USB hub 200, having the respective constructions described above, a producer of the USB hub selects one of two types of hubs for production. As a result, the consumer is limited as to what he or she may select to fit his or her use.

Moreover, when a user selects one of the two types of hubs but wants to use the USB hub, problems in the power rating for each type of hub occur.

That is, the bus power USB hub 100 is not able to use peripheral equipment having a high power consumption (such as a digital camera). In addition, when the self-power USB hub 200 is used, a power cable and local power source unit 300 are needed, which is very inconvenient. The latter are needed for peripheral equipment, such as mouse or key board, which have a low power consumption requirement. Such a requirement can be covered amply by the bus power USB hub 100.

Figure 3:
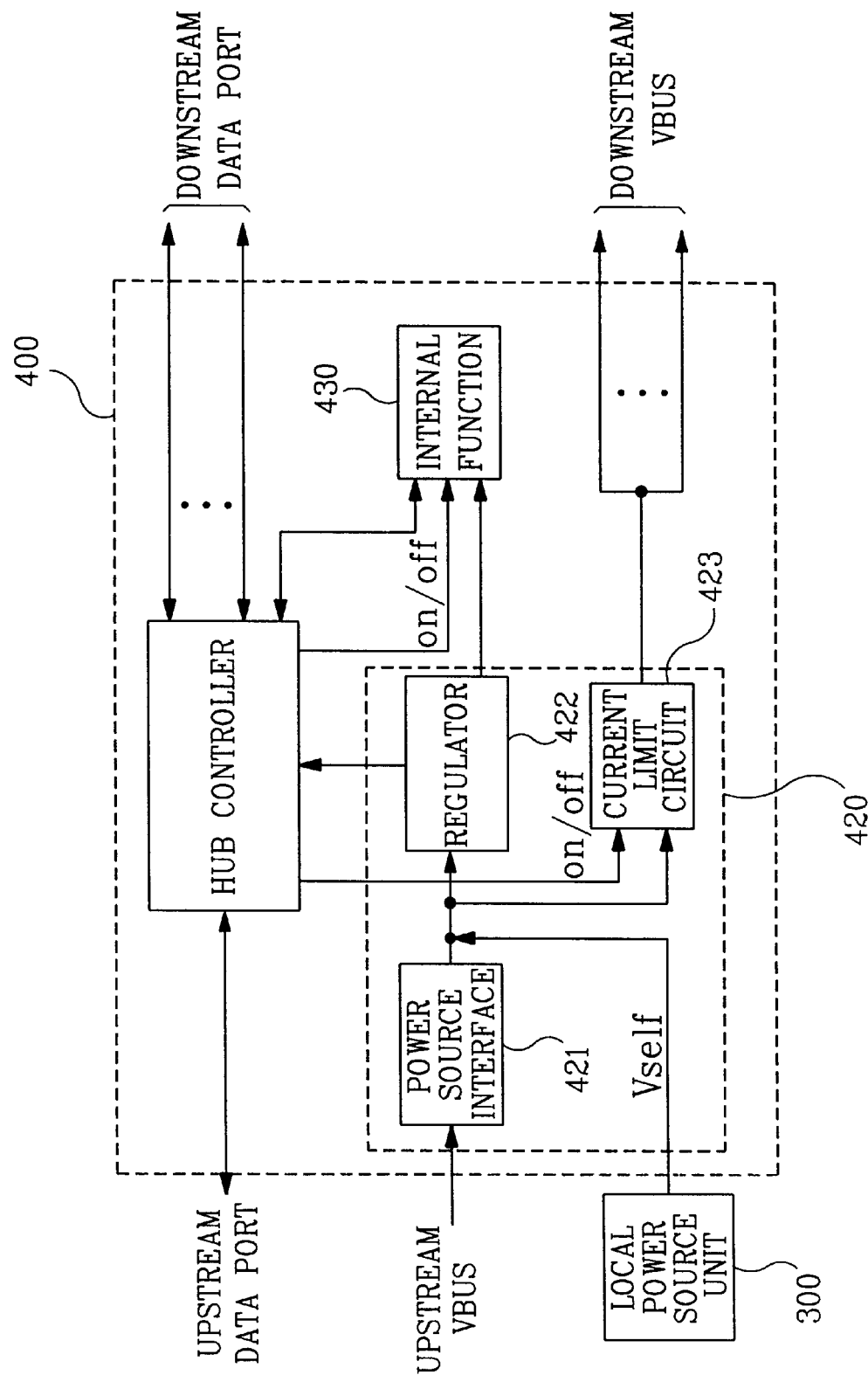
FIG. 3 is a schematic block diagram illustrating one embodiment of a USB hub having a plurality of input power sources in accordance with the present invention.

FIG. 3 is a schematic block diagram illustrating one embodiment of a USB hub having a plurality of input power sources in accordance with the present invention.

As shown in FIG. 3, the USB hub 400 has a plurality of input power sources and is provided with both bus power Vbus inputted through an upstream cable via the power source interface 421, and self-power Vself generated by a local power source unit 300.

Other parts of this arrangement are the same as that of the self-power USB hub 200 shown in FIG. 2. Accordingly, an explanation therefor is omitted, and operation of the present invention as seen in FIG. 3 will now be described.

As shown in FIG. 3, as to the USB power source unit 420, bus power Vbus is applied to a regulator 422 and a current limit circuit 423 through the power source interface 421, while self-power Vself generated by the local power source unit 300 is directly applied to the regulator 422 and the current limit circuit 423.

That is, the power source interface 421 is placed between an input terminal of the upstream bus power Vbus and that of the self-power Vself.

With this construction, it is required that the bus power Vbus not experience a voltage step-down while it flows through the power source interface 421. At the same time, the self-power Vself should not flow into the upstream cable. In this respect, whether or not the self-power Vself is provided is determined by the user's connecting an additional power source cable to the USB hub.

Figure 4:
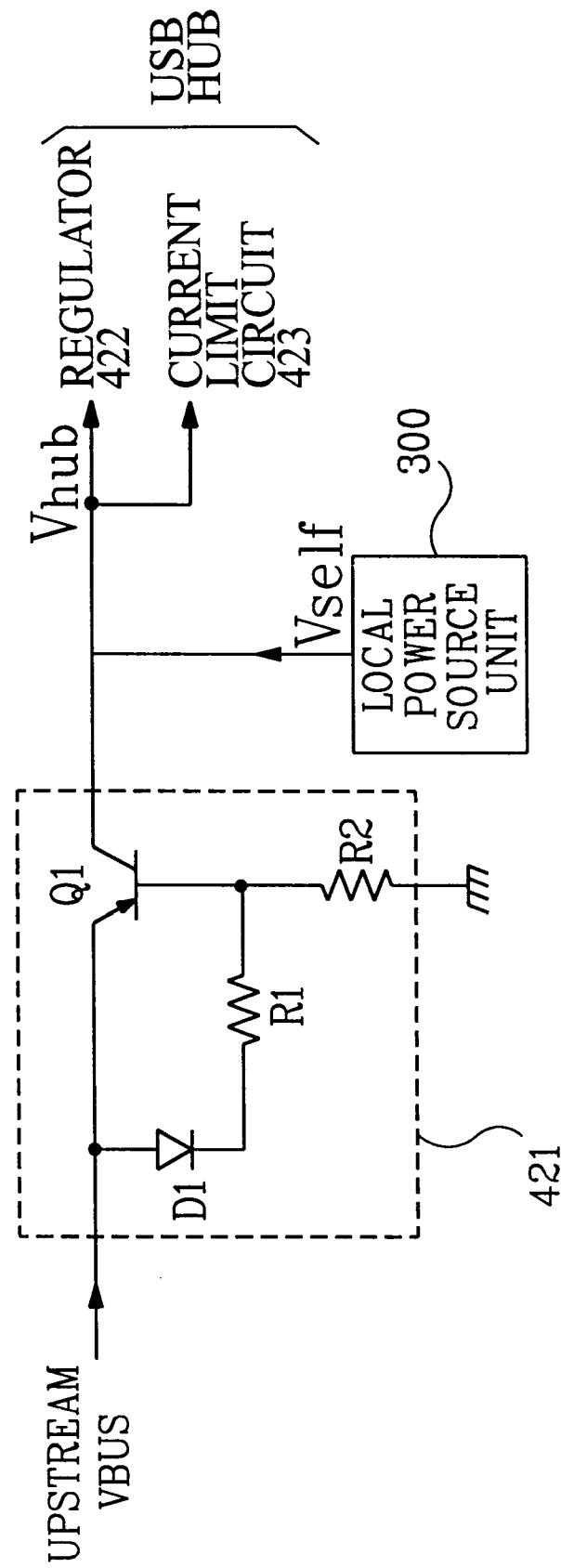
FIG. 4 is a circuit diagram illustrating one embodiment of a power source interface of FIG. 3.

FIG. 4 is a circuit diagram illustrating one embodiment of power source interface of FIG. 3. The power source interface 421 includes: a common base transistor Q1 circuit which is a power source transmitting device for transmitting the bus power Vbus to the output terminal without additional voltage step-down; and diode D1 which is a device for preventing a reverse-current so that the self-power Vself does not flow to the upstream cable (the path of the bus power Vbus). The diode D1 is connected between an emitter terminal, which is an input terminal of the common base transistor Q1, and a base terminal thereof.

Detailed construction of the power source interface 421 is as shown in FIG. 4, in which the bus power Vbus is supplied to the emitter of the PNP-type transistor Q1 and, at the same time, is also supplied to the base terminal through the reverse-current prevention diode D1 (connected in a positive direction) and the bias resistance R1. The junction between the bias resistance R1 and the base terminal is grounded through resistance R2. The collector terminal of the transistor Q1 is commonly connected to the self-power Vself input terminal from local power source unit 300, to the input of regulator 422, and to the input of current limit circuit 423.

Operation of the USB hub 400 having input power sources in accordance with the present invention will now be described.

First, when only the bus power Vbus is supplied to the USB hub 400 through the USB cable, transistor Q1 is turned on as current flows to the base of the transistor Q1 by means of the voltage distributed by the two resistances R1 and R2. Accordingly, the bus power Vbus is applied to the downstream port through the regulator 422 and the current limit circuit 423. At this point, since there is little voltage step-down between the emitter and the collector of the transistor Q1, the voltage Vhub applied to the regulator 422 and the current limit circuit 423 reflects the voltage of the bus power Vbus. In this respect, the normal voltage is 5V.

Second, when self-power Vself and bus power Vbus are both to be supplied by connecting an additional cable, since the voltage of the collector of the transistor Q1 becomes higher than the voltage of the base, current does not flow to the base terminal. That is, the transistor Q1 is in a state of 'OFF'. Thus, the voltage Vhub applied to the regulator 422 and the current limit circuit 423 is self-power from local power source unit 300, not bus power Vbus.

As a result, based on selection of the cable for self-power by the user, either bus power Vbus or self-power Vself is supplied to the USB hub. Except for the above-described cases, the case wherein only the self-power Vself is supplied by an additional power source cable is meaningless. The reason is that the bus power Vbus is an applied power source which is included in the USB cable, that is, a communication cable of the USB hub and the main body of the personal computer. Thus, the fact that the bus power Vbus is not applied signifies that the USB hub is not able to communicate with the main body of the personal computer.

As thus described, in the present invention, the USB hub has a plurality of input power sources. A circuit is constructed so that the user can select bus power or self-power as to the power source of the USB hub depending on the user's necessity. As a result, it is not necessary for the user to purchase a bus power USB hub or a self-power USB hub separately. The user who employs the present invention can easily select a power source supply method which fits his use by simply adding a power source cable for self-power.

Although the preferred embodiment of the present invention has been disclosed for illustrative purposes, those skilled in the art will appreciate that various modifications, additions and substitutions are possible, without departing from the scope and spirit of the invention as recited in the accompanying claims.

What is claimed is:

1. A universal serial bus (USB) hub having a plurality of input power sources including a power source connected through an upstream cable and a local power source unit, wherein power from said plurality of input power sources is selectively used as internal consumption power of the USB hub and as power distributed to satisfy at least one USB function through at least one downstream port;

wherein said USB hub includes a hub controller and a power source interface for receiving as inputs both bus power provided through the upstream cable and self-power generated by said local power source unit, and wherein the self-power is supplied to and used be the USB hub controller when the user connects an additional power source cable to the USB hub, and wherein the bus power is supplied to and used by the USB hub controller when the user does not connect the additional power source cable to the USB hub.

2. The USB hub as claimed in claim 1, wherein the power source interface is disposed between the upstream cable and the local power source unit.

3. The USB hub as claimed in claim 2, wherein the power source interface includes:

power source transmitting means for transmitting the bus power to an output terminal without additional voltage step-down; and reverse-current preventing means for preventing self-power from flowing to the upstream cable.

4. The USB hub as claimed in claim 3, wherein said power source transmitting means comprises a common base transistor circuit including an emitter terminal and a base terminal, and wherein said reverse-current preventing means is connected between the emitter terminal and the base terminal.

5. The USB hub as claimed in claim 4, wherein said reverse-current preventing means comprises a diode.

6. The USB hub as claimed in claim 4, wherein the bus power is supplied to the emitter terminal, and is supplied to the base terminal through the reverse-current preventing means and a bias resistance; and wherein a junction between the bias resistance and the base terminal is grounded through a further resistance, and the transistor has a collector terminal connected to the local power source unit and to said at least one downstream port.

7. The USB hub as claimed in claim 6, wherein said at least one downstream port includes a current limit circuit having an input connected to the collector terminal and an output connected to at least one downstream bus.

8. The USB hub as claimed in claim 7, wherein the collector terminal is connected to an input of a regulator which has an output for performing at least one internal function.

9. The USB hub as claimed in claim 6, wherein the collector terminal is connected to an input of a regulator which has an output for performing at least one internal function.

10. A universal serial bus (USB) hub for selectively utilizing power from an upstream bus and a local power source, said USB hub comprising:

power source interface means connected to the upstream bus for receiving the power therefrom, and for providing a power output; and current limiting means connected to the local power source for receiving the power therefrom, and connected to the power source interface means for receiving the power output therefrom, said current limiting means providing a current limited output;

wherein the power output of said power source interface means is used to execute internal functions of the USB hub, and the current limited output of said current limiting means is provided to a downstream bus to control external functions.

11. The USB hub as claimed in claim 10, wherein self-power is supplied to the USB hub in dependence on a user connecting a power source cable from the local power source to the USB hub.

12. The USB hub as claimed in claim 10, wherein said power source interface means is disposed between the upstream bus and the local power source.

13. The USB hub as claimed in claim 12, wherein said power source interface means includes:

a power source transmitter for transmitting the bus power to an output terminal without additional voltage step-down; and a reverse-current prevention device for preventing self-power from the local power source from flowing to the upstream bus.

14. The USB hub as claimed in claim 13, wherein said power source transmitter comprises a common base transistor circuit including an emitter terminal and a base terminal, and wherein the reverse-current prevention device is connected between the emitter terminal and the base terminal.

15. The USB hub as claimed in claim 14, wherein the reverse-current prevention device comprises a diode.

16. The USB hub as claimed in claim 14, wherein the bus power is supplied to the emitter terminal, and is supplied to the base terminal through the reverse-current prevention device and a bias resistance; and wherein a junction between the bias resistance and the base terminal is grounded through a further resistance, and the transistor has a collector terminal connected to the local power source unit and to at least one of said current limiting means and a regulator.

17. The USB hub as claimed in claim 16, wherein said current limiting means has an input connected to the collector terminal and an output connected to at least one downstream bus.

18. The USB hub as claimed in claim 17, wherein the collector terminal is connected to an input of said regulator, and said regulator has an output for performing at least one internal function.

19. The USB hub as claimed in claim 16, wherein the collector terminal is connected to an input of said regulator, and said regulator has an output for performing at least one internal function.

20. A universal serial bus (USB) hub having a plurality of input power sources including a power source connected through an upstream cable and a local power source unit, wherein power from said plurality of input power sources is selectively used as internal consumption power of the USB hub and as power distributed to satisfy at least one USB function through at least one downstream port;

wherein said USB hub includes a power source interface for inputting both bus power provided through the upstream cable and self-power generated by said local power source unit, and wherein the self-power is supplied to the USB hub in dependence on the user connecting an additional power source cable to the USB hub;

wherein the power source interface is disposed between the upstream cable and the local power source unit; and wherein the power source interface includes:

power source transmitting means for transmitting the bus power to an output terminal without additional voltage step-down; and reverse-current preventing means for preventing self-power from flowing to the upstream cable.

21. The USB hub as claimed in claim 20, wherein said power source transmitting means comprises a common base transistor circuit including an emitter terminal and a base terminal, and wherein said reverse-current preventing means is connected between the emitter terminal and the base terminal.

22. The USB hub as claimed in claim 21, wherein said reverse-current preventing means comprises a diode.

23. The USB hub as claimed in claim 21, wherein the bus power is supplied to the emitter terminal, and is supplied to the base terminal through the reverse-current preventing means and a bias resistance; and wherein a junction between the bias resistance and the base terminal is grounded through a further resistance, and the transistor has a collector terminal connected to the local power source unit and to said at least one downstream port.

24. The USB hub as claimed in claim 23, wherein said at least one downstream port includes a current limit circuit having an input connected to the collector terminal and an output connected to at least one downstream bus.

25. The USB hub as claimed in claim 24, wherein the collector terminal is connected to an input of a regulator which has an output for performing at least one internal function.

26. The USB hub as claimed in claim 23, wherein the collector terminal is connected to an input of a regulator which has an output for performing at least one internal function.

* * * * *